United States Patent [19]

Nuckolls et al.

[11] Patent Number: 4,810,936

[45] Date of Patent: Mar. 7, 1989

[54] FAILING LAMP MONITORING AND DEACTIVATING CIRCUIT

[75] Inventors: Joe A. Nuckolls, Blacksburg; Isaac L. Flory, Harrisonburg, both of Va.

[73] Assignee: Hubbell Incorporated, Orange, Conn.

[21] Appl. No.: 936,231

[22] Filed: Dec. 1, 1986

[51] Int. Cl.$^4$ .......................................... H05B 37/00
[52] U.S. Cl. .................... 315/119; 315/120; 315/129; 315/136; 315/289; 361/93
[58] Field of Search ............. 315/119, 120, 127, 241, 315/129, 136, 289; 324/521, 57; 361/94; 340/642

[56] References Cited

U.S. PATENT DOCUMENTS

| | | | |
|---|---|---|---|
| 2,324,875 | 7/1943 | Peterson et al. | 315/136 |
| 2,508,548 | 5/1950 | Spaulding et al. | 315/127 |
| 3,249,859 | 5/1966 | Speros et al. | 324/24 |
| 3,345,538 | 10/1967 | Peterson et al. | 315/127 |
| 3,579,029 | 5/1971 | Spescha | 315/127 |
| 3,594,636 | 7/1971 | Gibbs | 324/51 |
| 3,648,103 | 3/1972 | Okada | 315/136 |
| 3,679,991 | 7/1972 | Wilwerding | 315/127 |
| 3,681,662 | 8/1972 | Specha | 315/127 |
| 3,735,378 | 5/1973 | McNamee | 315/129 |
| 3,955,119 | 5/1976 | Perry et al. | 315/136 |
| 3,967,191 | 6/1976 | Roche | 324/20 |
| 4,009,387 | 2/1977 | Nuver | 250/205 |
| 4,190,795 | 2/1980 | Schultheis | 323/17 |
| 4,206,385 | 6/1980 | Wisbey | 315/119 |
| 4,207,500 | 6/1980 | Duve et al. | 315/119 |
| 4,222,047 | 9/1980 | Finnegan | 315/136 |
| 4,275,335 | 6/1981 | Ishida | 315/241 |
| 4,315,196 | 2/1982 | Kitayama | 315/136 |
| 4,441,056 | 4/1984 | Siglock | 315/127 |

FOREIGN PATENT DOCUMENTS

| | | | |
|---|---|---|---|
| 2425720 | 12/1975 | Fed. Rep. of Germany | 315/119 |
| 2741054 | 3/1979 | Fed. Rep. of Germany | 315/136 |
| 979458 | 1/1965 | United Kingdom | 315/127 |
| 2135540 | 8/1984 | United Kingdom | 315/129 |

Primary Examiner—Leo H. Boudreau
Assistant Examiner—Michael Razavi
Attorney, Agent, or Firm—Jerry M. Presson; Walter C. Farley

[57] ABSTRACT

A discharge lamp monitoring and deactivating circuit includes a normally closed switch in series with the discharge lamp and its ballast and a detector circuit connected across the lamp to monitor lamp operating voltage. The detector circuit includes a capacitor which is charged and discharged through separate paths so that a lamp electrical waveform change waveform can be detected, resulting in a net charge. The charge is used to open the switch after a time delay which is only manually resetable.

12 Claims, 2 Drawing Sheets

FAILING LAMP MONITORING AND DEACTIVATING CIRCUIT

This invention relates to circuit means connected to a discharge lamp for monitoring an electric characteristic of the lamp, determining when the lamp is about to fail, based on the electrical characteristic, and deactivating the lamp to avoid undesirable operational behavior.

BACKGROUND OF THE INVENTION

High intensity discharge (HID) and fluorescent lamps often undergo undesirable behavior patterns as they approach failure. Fluorescent lamps frequently flicker, swirl, and go off and on. High pressure sodium (HPS) lamps cycle off and on and arc within the lamp envelope. Some metal halide (MH) lamps explode and can generate a significant hazard. Most of this behavior is not only annoying to individuals working in the vicinity of such lamps but is also destructive to the ballast and other electrical components because the erratic behavior produces current and voltage surges and transients which accelerate failure of the dielectric components associated with the ballast, the electronic components, lead wires, sockets, lamp parts, etc. Also, as indicated above, the undesirable nature of this behavior goes beyond fixture reliability and life reduction especially in the case of the metal halide lamps which have been known to explode and drop hot lamp pieces which are capable of burning individuals and starting fires. Manufacturers of such lamps have therefore specified the use of glass doors in fixtures which employ MH lamps which increases the fixture cost and decreases the optical efficiency.

It is also possible for such lamp explosions to release the chemicals within the lamp, such as mercury, into the immediate environment, creating a possible toxicity problem.

At the very best, HPS lamps cycle on and off, creating an obnoxious lighting situation. When an HPS lamp is used for street lighting purposes, this cycling action makes visual direction of a failing HPS lamp a problem because when it is on it appears to be quite normal and a passing patrol car may not observe that cycling activity. Thus, the lamp can go through a number of on-and-off states before it is finally observed in the off state. During this time, the ballast is still energized and consuming electrical energy while not illuminating properly. All of the above leads to dissatisfaction with lighting systems using such lamps and also to increased maintenance costs.

SUMMARY OF THE INVENTION

Accordingly, an object of the invention is to provide a circuit which monitors the activity of a discharge lamp, either HOD or fluorescent, to detect when the lamp is approaching failure and to positively deactivate the lamp to prevent the annoyance, degradation or danger which can accompany failing lamp behavior.

A further object is to provide such a circuit which includes a switch which is opened by the circuit to deenergize the lamp and which must be manually reset when the lamp is replaced.

Briefly described, the invention includes a discharge lamp monitoring and deactivating circuit comprising the combination of a discharge lamp, a source of electrical energy connected to the lamp to ignite and operate the lamp as a source of illumination, normally closed, selectably openable switch connected between the lamp and the source, and detection circuit means connected to the lamp for monitoring a selected electrical characteristic of the lamp under operating conditions to detect a feature of the electrical characteristic indicative of imminent failure of the lamp and for producing switch control signals for opening the switch to thereby deactivate the lamp when failure thereof is imminent.

In order to impart full understanding of the manner in which these and other objectives are attained in accordance with the invention, particularly advantageous embodiments thereof will be described with reference to the accompanying drawings, which form a part of this specification, and wherein.

DESCRIPTION OF THE PREFERRED EMBODIMENTS

The techniques employed in the present invention are based upon recognition of the fact that voltage and current waveforms across an operating discharge lamp are normally stable and can also be symmetrical after the lamp has thermally stabilized. Thus, the positive-going half cycle and the negative going half cycle may be very much the same but, in any event, there is substantial similarity from one waveform to the next during the normal opening life of the lamp. The shapes of these waveforms can vary drastically from one lamp system to another and it is generally true that they are not very close to a sinusoidal waveform, but the symmetry remains. The waveforms are dependent upon many factors such as the type of ballast circuit used, the dynamic impedance, whether the lamp is new or has aged, the operating wattage, temperature and the like, and also the dynamic switching behavior of the lamp itself.

It has been found that the waveform of a lamp which is approaching failure changes its characteristic so that changes occur in one of the half cycles from one cycle to the next. Accordingly, by monitoring the voltage of current across the lamp itself under operating conditions, and by comparing the same half cycle from one cycle to the next, it is possible to detect the feature which indicates that the lamp is about to fail and using the existence of that feature to deactivate the lamp, preferably by opening a switch in series with the lamp. Either half cycle can be used or both can be used.

Figure 1:
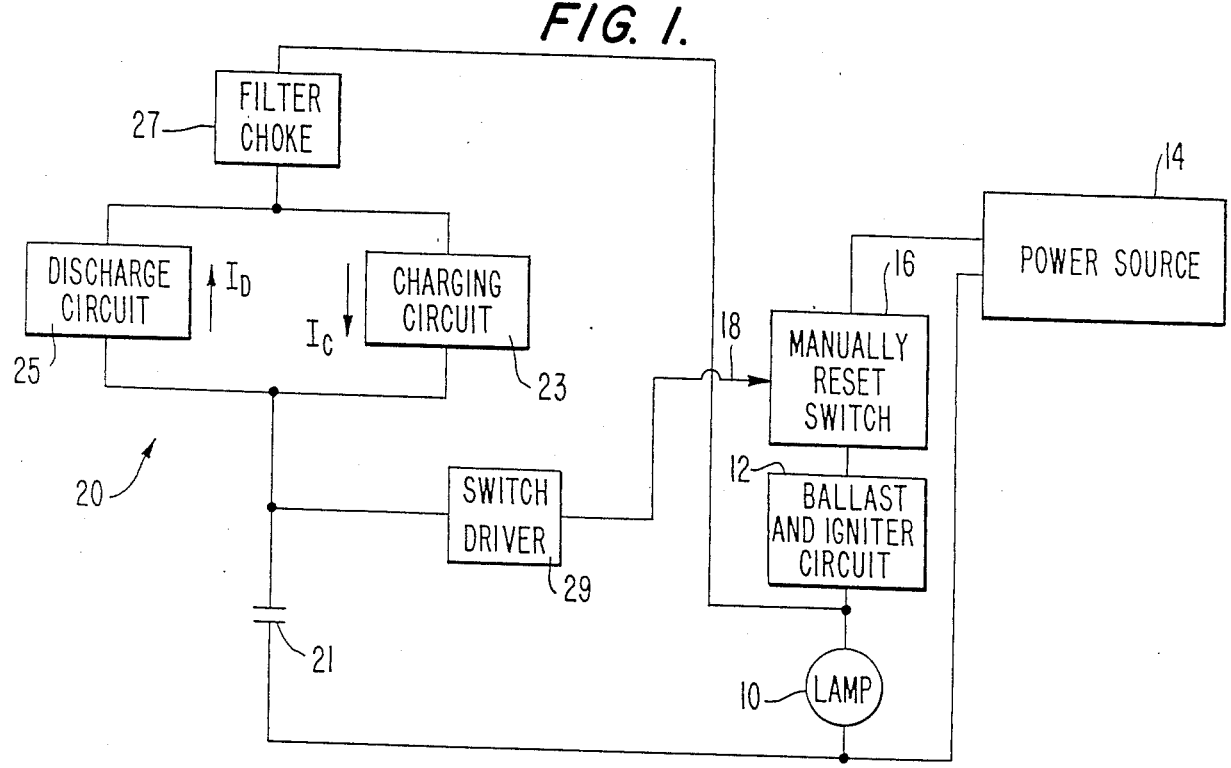
FIG. 1 is a schematic block diagram of a circuit in accordance with the invention.

FIG. 1 shows a rather generalized circuit for monitoring the lamp operating voltage for this purpose. As shown therein, a discharge lamp 10 is connected in series circuit relationship with a ballast 12 across a power source 14 which can also include an igniter circuit of a conventional type, depending upon the nature of lamp 10. A manually resetable switch 16 is also connected in series with the lamp and ballast, the switch being normally closed so that the ballast and lamp are normally connected across the source. This switch is, of course, in addition to any wall or other power switch supplied to permit turning the lamp on or off at will. The switch 16 is of a type which can be actuated to an open position by an electrical or mechanical signal received on a line 18. Preferably, the switch can only be operated in one direction by the circuit of the invention, i.e., it can only be opened and will remain open until it is manually closed. Switches whic fulfill these requirements are available, as will be described.

A detection circuit indicated generally at 20 is connected in parallel circuit relationship with the lamp, the circuit including a capacitor 21, a charging circuit 23, a discharging circuit 25, and a filter choke 27. The detection circuit also is associated with a switch driver 29 which responds to a charge level on capacitor 21 to provide the previously mentioned signal from line 18.

Filter choke 27 is a radio frequency choke which is included to protect the detector circuit components from the high frequency starting pulses which can be present, particularly with lamps such as high pressure sodium lamps, and also prevents the detector circuit from loading the igniter circuit and thereby reducing the magnitude of the high voltage pulses which are necessary to start te operating of some lamps. This filter choke is included in all embodiments and will not be further described in any detail.

Charging and discharging circuits 23 and 25 are undirectional circuits oriented to permit a charging current $I_c$ to flow to capacitor 21 and a discharge current $I_d$ to flow to the capacitor. In its simplest form, the charge and discharge currents can be substantially equal and opposite when the waveform is symmetrical. Thus, at the end of each full cycle, the net charge on the capacitor is substantially zero and there is no net voltage for the switch driver 29 to respond to. However, when non-symmetry develops, a charge accumulates on capacitor 21, providing a net voltage of sufficient magnitude to cause the switch driver to open switch 16 after a delay.

It will be recognized that it is clearly undesirable for the detection circuit and switch driver to operate instantaneously. Rather, the circuit should be designed so that a rather long interval of non-symmetrical operation transpires before the switch is opened. This is necessary because non-symmetrical operation can occur for a relatively short interval during the initial start up of the lamp or, should be lamp be deenergized for any reasons, during restarting. Thus, the accunulation of a charge and the operation of the switch driver and switch 16 should be delayed for some interval of time, preferably several minutes. If non-symmetrical operation persists for that interval, then switch 16 should be opened. It is therefore important for a time delay of known and repeatable length to be built into the circuit at some location. Some delay can be incorporated into the detector circuit or driver but the most convenient location to build in a delay of suitable length (a number of minutes) is in the manually reset switch.

As previously indicated, the lamp voltage waveforms are dependent upon a number of factors and the nature of the nonsymmetry which develops as the lamp approaches failure can be a function of lamp type and other things. Accordingly, it is desirable to select specific circuits for the charging and discharging circuit which respond to particular characteristics of the positive and negative half waves and changes in the waveform within each half cycle so that the feature which is indicative of failure in a particular installation can be emphasized.

Figure 2:
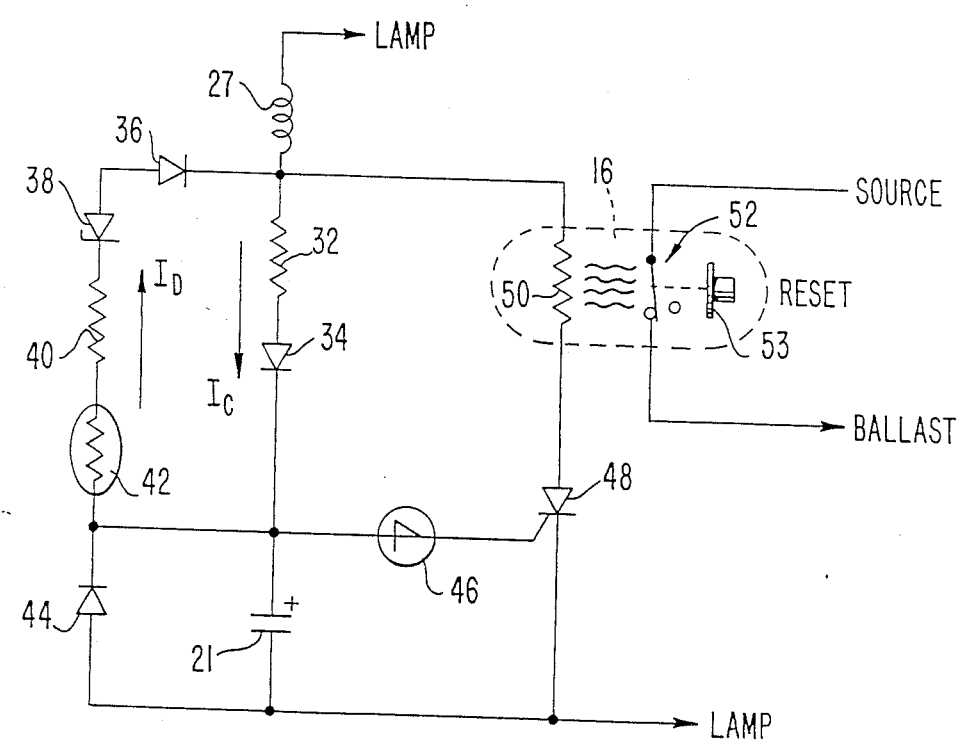
FIG. 2 is a schematic circuit diagram of one embodiment of a circuit implementing the invention.

FIG. 2 shows a circuit which is usable to the detection and switching circuit to deactivate a discharge lamp as discussed above. The detection circuit includes choke 27 and a charging circuit including a resistor 32 in series with a diode 34 polarized to conduct charging circuit to the capacitor so that the capacitor will be polarized in the manner shown during the first half-cycle.

The discharge circuit includes a diode 36, polarized in the direction opposite to diode 34, a voltage sensing or breakdown diode 38, a resistor 40 and a resistor 42. Diode 38 is selected to have a breakdown voltage at, for example, 300 volts and can be a Zener diode or Shockley diode (SIDAC). Resistor 42 can be a positive temperature coefficient resistor or, alternatively, a thermal switch, and resistor 40 is a current limiting resistor. A diode 44 is also connected in parallel with capacitor 21 to protect the capacitor by preventing polarity reversal.

In this circuit, the discharge path constitutes a peak sensing circuit as the result of including the breakdown diode 38. The charging circuit, however, responds to the average value of the half waveform. Thus, the capacitor charge is proportional to the average value of one half-cycle and the discharge is accomplished at a rate proportional to the energy in the peak portion of the waveform in the other half cycle.

The capacitor 21 is connected through a further breakdown diode 46 to the gate electrode of a conventional silicon controlled rectifier (SCR) 48, the switchable conductive current-carrying path of which is connected in series current-carrying with a heater resistor 50 forming a path of switch 16. When a lamp is failing and the lamp voltage waveform becomes peaked, capacitor 21 is repeatedly charged and discharged and SCR 48 repeatedly fired to produce a sequence of current pulses through heater resistor 50. Heater 50 is thermally coupled to a thermally responsive contact set indicated generally as 52 which opens when a sufficient quantity of energy has been dissipated by resistor 50 and remains open until it is manually reset by operation of reset button 53. Switch 16 is a commercially available item.

PTC resistor 42 is included in the discharge circuit as an optional but helpful feature to stabilize the operation of the circuit. The PTC resistor produces a substantially constant temperature, thereby minimizing the effect of ambient temperature and variations in the voltage driving the heater.

From the above discussion, it will be recognized that many variations on the concept of electronically separating the lamp waveform into portions which exhibit detectable changes can be accomplished and that these changes can be summed and the summation acted upon to disable the lamp. In some cases it may be desirable, for example, to use the peak portion to charge the capacitor 21 and the average to discharge the capacitor.

Figure 3:
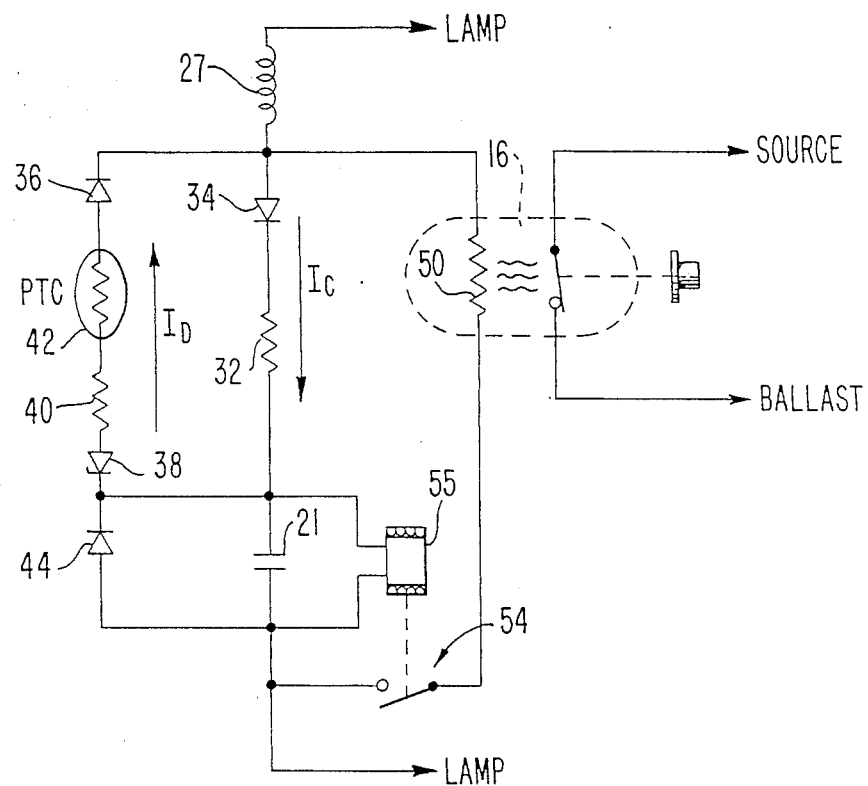
FIG. 3 is a schematic circuit diagram of a further embodiment of the invention.

FIG. 3 shows a somewhat similar circuit using an electromagnetic relay in place of an electronic switch. It will be recognized that the charging and discharging circuits remain the same. However, the switchable conductive path of the SCR is replaced by a normally open contact set 54 which is actuated by a relay winding 55 connected in parallel with capacitor 21. When the capacitor reaches a predetermined voltage, contact set 54 is closed and heating current flows in resistor 50.

Again, the discharge circuit includes a PTC resistor which causes the circuit to be overridden by the average component of the waveform to operate the relay after a number of minutes of open circuit operation, i.e., after the lamp has completely failed.

In the circuits of FIGS. 2 and 3, the discharge time constant should be chosen to be somewhat short as compared with the charging time constant. As an example, a discharge time constant of approximately 0.47 seconds as compared with a charging time constant of 3.3 seconds is appropriate. The Zener or sidac device 38 allows the discharge current to flow for only a fraction of the half cycle, making the circuitry more sensitive to peak waveform levels.

While the circuits of FIGS. 2 and 3 are suitable for a wide variety of fluorescent and HPS discharge lamps, the metal halide lamps require a circuit which clearly turns off the fixture prior to violent failure of the metal halide because of the disastrous consequences, discussed above, which can result from an MH lamp failure.

Figure 4:
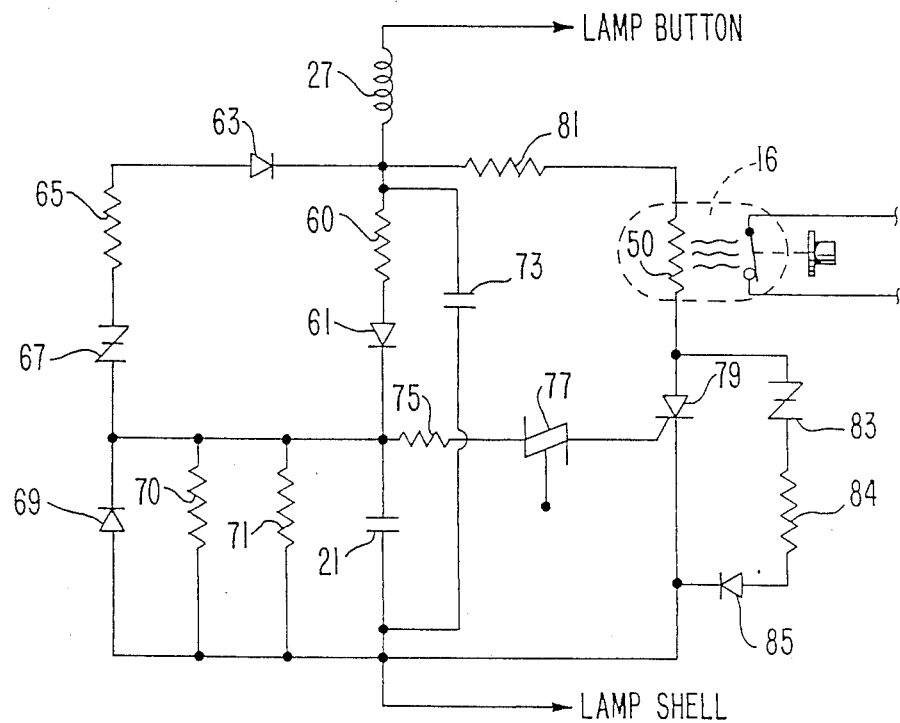
FIG. 4 is a schematic circuit diagram of a further embodiment of a circuit in accordance with the invention.

As before, the detection circuit shown in FIG. 4 is connected across the lamp itself, the upper end of choke 27 being connected to the lamp button (the conductive button at the center of the screw base) and the common end of the circuit being connected to the screw base shell. The charging circuit includes a resistor 60 and a diode 61 connected in series circuit relationship with decoder 21 and the discharge circuit includes a diode 63, polarized in the opposite direction from diode 61, connected in series circuit relationship with a current limiting resistor 65 and a breakdown diode 67 such as Zener diode. A diode 69 is connected in parallel circuit relationship with fixed resistors 70 and 71 and capacitor 21. A relatively small capacitor 73 is connected from the lower end of choke 27 to the connection point with the screw base shell.

The upper end of capacitor 21 is connected through a small current limiting resistor 75 and a breakdown device 77 to the gate electrode of an SCR 79 the switchable conductive path of which is connected in series circuit relationship with the heater resistor 50 of thermal switch 16. A current limiting resistor 81 is also connected in series with the heating resistor. A series circuit including a Zener diode 83, a resistor 84 and a diode 85 is connected in parallel with the switchable conductive path of the SCR.

As previously indicated, diodes 61 and 63 are oppositely polarized to properly direct the charging and discharging currents for the integrating capacitor 21. The charging current for capacitor 21 is responsive to the voltage waveform across the lamp, the high voltages of the ignition pulses being prevented from appearing across the detection circuit by the action of choke 27 and the voltage clamping action of the high frequency bypass capacitor 73. Charging current proportional to the average lamp voltage during the positive half cycle flows through components 27, 60 and 61 to charge capacitor 21. Discharge current responsive to the peak lamp voltage during the other half cycle flows through components 67, 65, 63 and 27, allowing a degree of discharge of the capacitor. However, no discharge current flows until the lamp voltage exceeds the breakdown voltage of device 67 which, normally, would be chosen to be about 265 volts. Again, diode 69 prevents complete discharge of capacitor 21 to prevent reversal which would damage a standard electrolytic capacitor.

Resistors 2 and 3 are included to adjust the time constant to a very close tolerance with capacitor 9, limiting the integration period (1 time constant) to a selected number of cycles. With resistors 70 and 71 having values of 47K ohms and 4.7K ohms, respectively, and using a 100 microfarad capacitor for capacitor 21, the time comstant is llimited to approximately 26 cycles.

Breakdown device 77 can be selected to have a relatively low voltage breakdown such as about 8 volts. With a typical driving voltage waveform, the voltage across capacitor 21 can reach 8 volts and cause device 77 to become conductive, thereby turning on SCR 79 and discharging the capacitor through resistor 75 each positive half cycle while the waveform condition persists. Each "turn-on" of SCR 79 causes heating current to flow through heater resistor 50 and the components connected in series therewith. With this operation, sufficient heat is generated by resistor 50 to cause its thermally coupled switch to open after about 10 minutes of operation. As will be recognized, this heating effect does not occur until the voltage across the HPS lamp has the high peaks or levels which are characteristic of impending failure of the lamp.

The network comprising series connected sidac or Zener diode 83, resistor 84 and diode 85 are used to sense a completely failed lamp in which voltage equivalent to open-circuit voltage appears across the detection circuit. It has been found that this network causes the "turn-on" switch time to remain at approximately 10 minutes when the higher open circuit voltage is supplied. The breakdown level of the discharge device 83 (about 235 volts) is such that the breakdown and conduction occurs through heater resistor 50 only during open circuit conditions, thus preventing premature or untimely "turn-off" of a fixture which has a good lamp.

As will be recognized, the circuit of FIG. 4 has a relatively long time delay which is achieved in a very reliable fashion using the sensing circuit along with the combination of a heater resistor, normally a positive temperature coefficient device, and a thermally responsive switch which can be a bimetal device. The components which accomplish this very long and reliable time delay are quite inexpensive and yield excellent repeatability. It is possible to control the amount of energy applied to the thermal switch to achieve even longer time delays, although if the energy level is too low the PTC element will stabilize at a temperature which is insufficient to cause the bimetal switch to be actuated. However, by using a series resistor 81 having a relatively small value (e.g., 650 ohms) the amount of energy transferred to the positive temperature coefficient heating element can be controlled in such a way to realize long time delays, up to about 15 minutes, with fully reliable activation. The cold resistance of resistor 50 (25° C) is about 1200 ohms. With the connection of resistor 81 and 50 in series, as current is applied through element 50, its resistance increases, causing more of the voltage in the series circuit to be applied across resistor 50, further increasing the amount of energy dissipated therein. Thus, the heating element enters an avalanche condition which avoids the problem of stabilization of the resistor at a level too low for switch actuation.

Following are typical values for circuit elements in FIG. 4.

| 21 | 100 microfarads |
|---|---|
| 27 | 50 millihenries |
| 50 | 1200 ohms @ 25° C. (PTC) |
| 60 | 33K ohms |
| 65 | 4700 ohms |
| 67 | 265 v. breakdown |
| 70 | 47K ohms |
| 71 | 4.7K ohms |

-continued

| | |
|---|---|
| 73 | 0.1 microfarads |
| 75 | 100 ohms |
| 81 | 650 ohms |
| 84 | 650 ohms |

While certain advantageous embodiments have been chosen to illustrate the invention, it will be understood by those skilled in the art that various changes and modifications can be made therein without departing from the scope of the invention as defined in the appended claims.

What is claimed is:

1. A discharge lamp monitoring and deactivating circuit comprising the combination of
    a discharge lamp;
    a source of electrical energy connected to said lamp to ignite and operate said lamp as a source of visible illumination;
    switch means coupling said lamp to said source to control the activation of said lamp in response to control signals;
    detection circuit means connected to said lamp for monitoring the A.C. operating voltage of said lamp under operating conditions to detect a substantial change between similar halves of successive cycles of the operating voltage indicative of imminent failure of said lamp and for producing control signals for deactivating said lamp when failure thereof is imminent; and
    means coupling said detector circuit to said switch means whereby said switch means can respond to said control signals from said detector circuit means.

2. A circuit according to claim 1, wherein said switch is a current-operated switch of a type which remains open after being current-actuated until manually reset.

3. A circuit according to claim 2, wherein said switch is thermally actuated.

4. A circuit according to claim 3, wherein said switch includes a heater resistor and a thermally responsive contact set thermally coupled to said heater resistor, and wherein said switch control signal is a heating current supplied to said heater resistor.

5. A circuit according to claim 1 wherein said detection circuit means includes
    a capacitor;
    a charging circuit including a diode connected in series circuit relationship with said capacitor, said series circuit being connected in parallel circuit relationship with said lamp so that said capacitor is charged during one half of the lamp operating voltage cycle; a discharging circuit including a diode connected in parallel circuit relationship with said charging circuit and in series circuit relationship with said capacitor to at least partially discharge said capacitor during the other half of said lamp operating voltage cycle; and
    a discharge device responsive to accumulated charge on said capacitor to produce said switch control signals when said lamp operating voltage changes sufficiently to indicate that said lamp is about to fail.

6. A circuit according to claim 5 wherein said switch includes a heater resistor and a thermally responsive contact set thermally coupled to said heater resistor, and wherein each said switch control signal is a heating current connected so said heater resistor.

7. A circuit according to claim 6 wherein said discharge device is a controlled rectifier switch having a control electrode coupled to said capacitor and a switchable conductive path connected in series circuit relationship with said heater resistor such that each said control signal is provided when said capacitor charge causes said rectifier switch to conduct.

8. A circuit according to claim 7 wherein said thermally responsive contact set is actuated to its open position only after said heater resistor has dissipated a predetermined amount of energy and wherein said predetermined quantity of energy is dissipated after a plurality of conductions of said rectifier switch.

9. A circuit according to claim 5 wherein said discharging circuit includes a breakdown diode having a breakdown voltage selected so that said discharging circuit responds primarily to peak voltages in said other half of said lamp operating voltage cycle.

10. A circuit according to claim 1 wherein said detection circuit means includes
    a capacitor;
    a charging circuit including a diode connected in series circuit relationship with said capacitor, said series circuit being connected in parallel circuit relationship with said lamp so that said capacitor is charged during one half of the lamp operating voltage cycle;
    a discharging circuit including a diode connected in parallel circuit relationship with said charging circuit and in series circuit relationship with said capacitor to at least partially discharge said capacitor during the other half of said lamp operating voltage cycle; and
    a electromagnetic relay having an energizing winding connected to be responsive to the voltage across said capacitor and a normally open contact set connected to provide a switch control signal to said normally closed switch when said winding is energized.

11. A circuit according to claim 1 wherein said normally closed switch includes
    a thermally responsive normally closed contact set, and
    a positive temperature coefficient resistor thermally coupled to said contact set;
    and wherein said detection circuit includes
    a resistor connected in series circuit relationship with said positive tempertaure coefficient resistor, said series circut being connected to receive said switch control signals from said detection circuit means to elevate the temperature of said positive temperature coefficient resistor thereby to open said normally closed contact set after dissipation of a predetermined amount of energy by said positive temperature coefficient resistor.

12. A method of monitoring the operation of a discharge lamp and deactivating the lamp under impending failure conditions comprising
    monitoring the characteristics of the lamp operating voltage waveform under normal operating conditions;
    detecting a change in a waveform characteristic form one portion of the waveform to another, the change being indicative of impending lamp failure; and
    deactivating the lamp when the change is detected.

* * * * *

UNITED STATES PATENT AND TRADEMARK OFFICE
CERTIFICATE OF CORRECTION

PATENT NO. : 4,810,936
DATED : March 7, 1989
INVENTOR(S) : Joe A. Nuckolls and Isaac L. Flory It is certified that error appears in the above-identified patent and that said Letters Patent is hereby corrected as shown below:

Claim 1:
 line 8, "activation" should read --operation--;
 line 18, "detector circuit" should read --detection circuit means--;
 line 20, "detector" should read --detection--.

Claim 2:
 line 1, "switch" should read --switch means--.

Claim 5:
 line 16, "switch" should read --switch means--.

Claim 11:
 lines 1 and 2, delete "normally closed".

Claim 12:
 line 7, at the end of the line, "form" should be --from--.

Signed and Sealed this

Fourteenth Day of November, 1989

*Attest:*

JEFFREY M. SAMUELS

*Attesting Officer*   *Acting Commissioner of Patents and Trademarks*